(12) United States Patent
Trumper et al.

(10) Patent No.: US 7,551,615 B2
(45) Date of Patent: Jun. 23, 2009

(54) METHOD FOR PACKET ENCAPSULATION AND REDIRECTION OF DATA PACKETS

(75) Inventors: Fabian Trumper, Modiin (IL); Avigdor Eldar, Jerusalem (IL)

(73) Assignee: Intel Corporation, Santa Clara, CA (US)

( * ) Notice: Subject to any disclaimer, the term of this patent is extended or adjusted under 35 U.S.C. 154(b) by 507 days.

(21) Appl. No.: 11/026,660

(22) Filed: Dec. 29, 2004

(65) Prior Publication Data

US 2006/0140181 A1  Jun. 29, 2006

(51) Int. Cl.
*H04L 12/28* (2006.01)

(52) U.S. Cl. ............. 370/389; 370/390; 726/11; 726/23

(58) Field of Classification Search ............. None
See application file for complete search history.

(56) References Cited

U.S. PATENT DOCUMENTS

| | | | |
|---|---|---|---|
| 5,425,023 A * | 6/1995 | Haraguchi et al. | 370/400 |
| 5,706,274 A * | 1/1998 | Angelico et al. | 370/445 |
| 5,708,659 A * | 1/1998 | Rostoker et al. | 370/392 |
| 6,393,483 B1 * | 5/2002 | Latif et al. | 709/226 |
| 6,715,084 B2 * | 3/2004 | Aaron et al. | 726/23 |
| 6,915,436 B1 * | 7/2005 | Booth et al. | 726/3 |
| 7,209,435 B1 * | 4/2007 | Kuo et al. | 370/219 |
| 7,225,270 B2 * | 5/2007 | Barr et al. | 709/238 |
| 2003/0149787 A1 | 8/2003 | Mangan | |
| 2004/0080529 A1 * | 4/2004 | Wojcik | 345/738 |
| 2004/0085895 A1 * | 5/2004 | Zettinger et al. | 370/220 |

FOREIGN PATENT DOCUMENTS

EP  1445896 A1  8/2004

OTHER PUBLICATIONS

"International Search Report for corresponding PCT Application No. PCT/US2006/001917",(Jun. 16, 2006), 4 pgs.
Housley, R. , et al., "EtherIP: Tunneling Ethernet Frames in IP Datagrams", *Request for Comments: 3378*, RSA Laboratories and VeriSign, Inc., (Sep. 2002), 9 pgs.
Kent, S., et al., "Security Architecture for the Internet Protocol", *IETF Standard, Internet Engineering Task Force*, BBN Corp. and @Home Network, (Nov. 1998), 67 pgs.
Lau, J., et al., "Layer Two Tunneling Protocol-Version 3 (L2TPv3)", *IETF Standard, Internet Engineering Task Force, IETF, CH*, Cisco Systems and Lucent Technologies, (Mar. 2005), 90 pgs.
Perkins, C. , "IP Encapsulation Within IP", *Request for Comment: 2003*, IBM, (Oct. 1996), 14 pgs.
Pignataro, L. W., et al., "Signaling and Encapsulation for the Transport of IP over L2TPv3;, draft-ietf-i2tpext-pwe3-ip-01.txt", *IETF Standard-Working-Draft, Internet Engineering Task force*, (Jan. 3, 2006), 19 pgs.
Woodburn, R. A., et al., "A Scheme for an Internet Encapsulation Protocol: Version 1", *Request for Comments: 1241*, SAIC, and University of Delaware,(Jul. 1991), 15 pgs.

* cited by examiner

*Primary Examiner*—Robert W Wilson
(74) *Attorney, Agent, or Firm*—Blakely, Sokoloff, Taylor & Zafman LLP

(57) ABSTRACT

A method to redirect data packets by a network controller to a network node. A network interface routes a data packet from the network node. Another network interface redirects the data packet from the network node. A switch selects between the two network interfaces based upon the state of the network node.

21 Claims, 3 Drawing Sheets

METHOD FOR PACKET ENCAPSULATION AND REDIRECTION OF DATA PACKETS

FIELD

The present subject pertains to communication systems and more particularly to in some embodiments routing a data packet through communication systems.

BACKGROUND

In modern communication systems, data typically is sent in packet form from one communication node through the network to another communication node. These packets typically include one or more headers and a payload which is the actual useful data to be sent, received and used by the communication nodes.

Maintaining integrity between network nodes and hosts becomes exceedingly important. Header information helps to route the data packet through various network nodes from a source to a destination. The payload is the actual information content being transmitted from the source node to the destination node. When the security of one of the network nodes has been compromised, such security breach may jeopardize other clients or hosts by distributing viruses, for example.

A network router may deny any network access to a communication node for various reasons. Such control would allow remote administration to instruct a network adapter residing on the network node or host to stop all network activity immediately. However, this control may have drastic results in that it would necessarily shut down the network node or host. Consider, for example, transactions in a banking operation. If the communication nodes or hosts were to be shut down, drastic consequences to individual finances or corporate finances might result.

Various techniques allow communication network node and communication networks to remain in communication. Some techniques depend on network software stack modules. Similarly, a "bump-in-the-wire" functions as an embedded application within a network controller. Both of these techniques have shortcomings.

DETAILED DESCRIPTION

Figure 1:
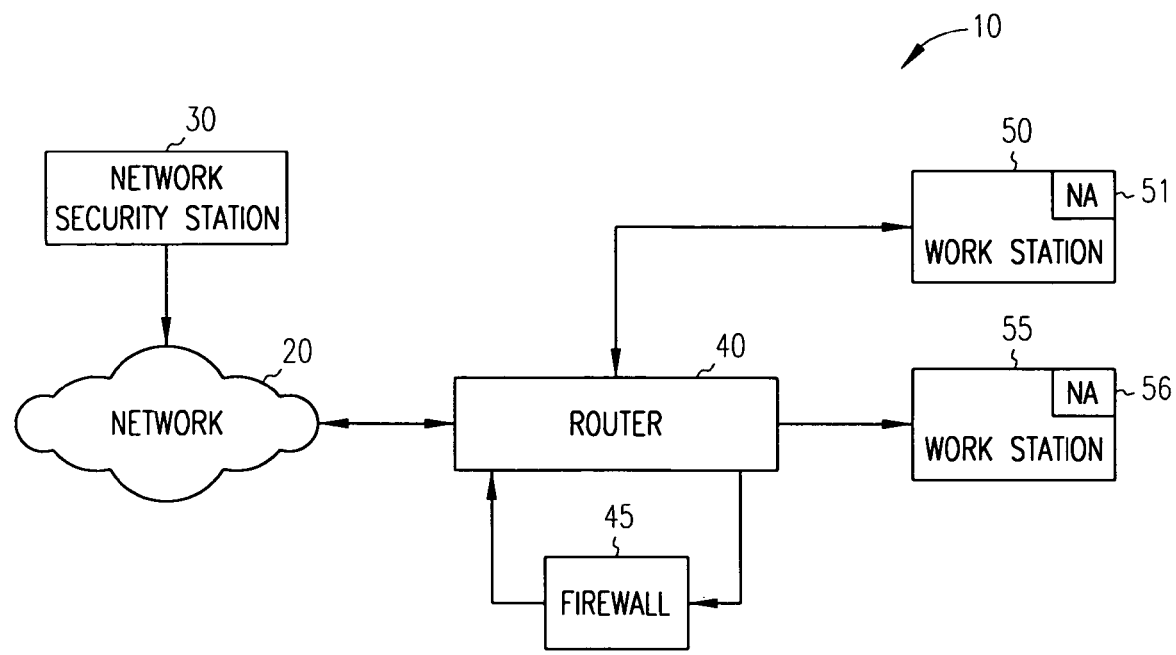
FIG. 1 is a block diagram of a communication system in accordance with an embodiment of the present invention.

FIG. 1 depicts a block diagram of a communication system 10 in accordance with an embodiment of the present invention. Workstations 50 and 55 represent communication network nodes or hosts. Workstations 50 and 55 are shown coupled through router 40 to network 20. Security policy may be provided to the network 20 and the communication system 10 by network security station 30 which may also be coupled to network 20. Workstations 50 and 55 each include a network adapter (NA) 51 and 56, respectively.

The description and the drawings illustrate specific embodiments of the invention sufficiently to enable those skilled in the art to practice them. Examples merely typify possible variations. Portions and features of some embodiments may be included in or substituted for those of others. The scope of the embodiments of the invention encompasses the full ambit of the claims and all available equivalents.

In some embodiments, the present invention relates to packet data encapsulation and packet routing by a communication network. In other embodiments, the present invention may pertain to network security and to methodology for dealing with a network node or host which has been tampered with. In some embodiments, the present invention also relates to switching between normal packet data transmission and "tunneling" packet data transmission. In another embodiment, the present invention may comprise a semiconductor device.

The references herein to RFC (Request for Comment) as defined by the Internet Engineering Task Force (IETF) and the Internet Engineering Steering Group (IESG) which are recorded and published as standards track RFCs. Request for Comment 2003 (C. Perkins, "IP Encapsulation within IP", RFC 2003, IBM, published September, 1996.) defines encapsulation as a method by which an internet protocol datagram may be encapsulated (carried as a payload) within an internet protocol datagram. For example, there is a method wrapping one IP datagram or packet as a payload within another IP datagram or packet.

Tunneling is a term typically used to describe the process of altering a normal routing path of an internet protocol (IP) data packet by appending another header. Typically, the first and last routing nodes of the alternate routing path are usually called the endpoints of the tunnel and the path between the endpoints is referred to as the tunnel.

The terms tunneling and encapsulation are typically used in a common context of creating a tunnel through the communication system. From RFC 2003, encapsulation is suggested as a means to alter the normal IP routing for datagrams, by delivering them to an intermediate destination that would otherwise not be selected based on the (network part of the) IP destination address field in the original IP header. Once the encapsulation datagram arrives at this intermediate destination node, it is de-encapsulated, yielding the original IP datagram, which is then delivered to the destination indicated by the original destination address field. This use of encapsulation and de-encapsulation of a datagram is frequently referred to as "tunneling" the datagram and the encapsulator and de-encapsulator are then considered to be the endpoints of the tunnel.

As a result, the IP data packet flow is typically from a source through an encapsulating function, through a de-encapsulating function to a destination. In general, there may be multiple source and destination pairs using the same tunnel between encapsulating function and de-encapsulating function.

In an embodiment, the network 20 may include a local area network (LAN) or an intranet. In another embodiment, the network 20 may include an internet arrangement. In another embodiment of the present invention network 20 may include a wireless local area network (WLAN).

There are many protocols which may be used for encapsulation and tunneling traffic between router 40, network 20 and network security station 30. In one embodiment, such protocols may include IP within IP encapsulation, RFC 2003. In another embodiment, these protocols may include IP within IP encapsulation protocol (layer to tunneling protocol). In yet another embodiment, such protocols may include Ethernet within IP encapsulation, RFC 3378 (R. Housley and S. Hollenbeck, "EtherIP: Tunneling Ethernet Frames in IP Datagrams", RFC 3378, published September 2002).

Further, in FIG. 1 firewall 45 may be coupled to router 40. Firewall 45 may includes a security gateway where the security policy of security station 30 can be enforced prior to the router 40 sending the packet data to network 20.

In normal operation, network nodes such as, workstations 50 and 55 are typically securely transmitting data packets back and forth through router 40 through network 20 while being monitored by network security station 30. In another embodiment, many other communication nodes or workstation (not shown for simplicity) may also be coupled to network 20. If workstation 55 is attacked by a virus, for example, workstation 55 may begin sending the virus to each of the other communication nodes or workstations 50, etc. being served by network 20.

In an embodiment of the present invention, the data from workstation 55 may be tunneled by router 40 through network 20 to firewall 45. Network adapter 56 of workstation 55 encapsulates each packet of data to direct it to the network security station 30. Firewall 45 then de-encapsulates each data packet and examines the contents for viruses or similar signs of tampering with workstation 55. The control of the encapsulation and tunneling may be performed by network security station 30 in communication with a control entity, network adapter 56, within each communication nodes or workstations 50 and 55, for example.

Network adapter 56 provides an interface for a normal routing of the data packets from workstation 55, for example. This normal routing occurs when there has been no detection of a tampering event or virus of workstation 55. Network adapter 56 also provides an interface for redirecting the suspected data packets from workstation 55. Network adapter 45 then selects or switches between the two interfaces on a single workstation basis when the security policy of station 30 indicates the given workstation has been compromised.

Figure 2:
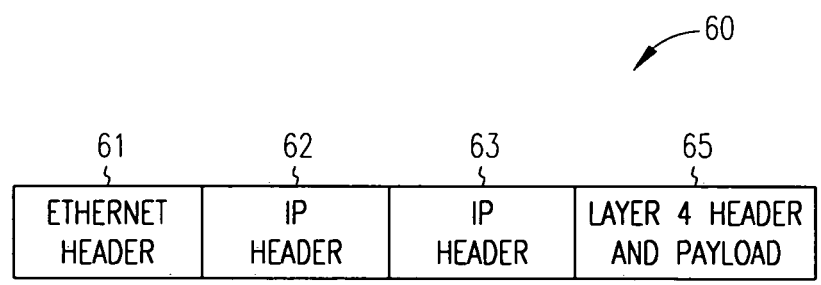
FIG. 2 is a layout of a data packet frame in accordance with an embodiment of the present invention.

Turning to FIG. 2, a layout of a frame of data packets in some embodiments is depicted. This packet data frame 60 may include a layer 4 header and payload 65 which may include data transmitted or to be received by workstation 55, for example. Header and payload 65 have been encapsulated or appended by IP (internet protocol) header 63. Header and payload 65 along with IP header 63 both have been encapsulated by appending IP header 62. Lastly, in the present example, header and payload 65, IP header 63, and IP header 62 have all been encapsulated by appending Ethernet header 61 to data packet 60.

As the combined data packet frame 60 moves through the network 20 various headers are de-encapsulated until immediately prior to transmission to workstation 55.

Ethernet header 61 may be a layer 2 type header which is used to direct the packet to another host on the same LAN (local area network). Header 61 may be referred to as a native header for any Ethernet-based LAN and is typically the header that each network controller examines for processing the data packet 60.

Next, IP (internet protocol) header 62 forms an encapsulation header supplied by an embodiment of the present invention. IP header 62 is typically a layer 3 header and has a routing function. In the embodiment of FIG. 2, header 62 is used to route the data packet 60 to a firewall entity in the network, such as firewall 45, for example.

While IP header 62 is typically an encapsulation header, IP header 63 may be the original IP header of the data packet 65. Data packet 65 may include a layer 4 header and the payload which is typically plain data.

Figure 3:
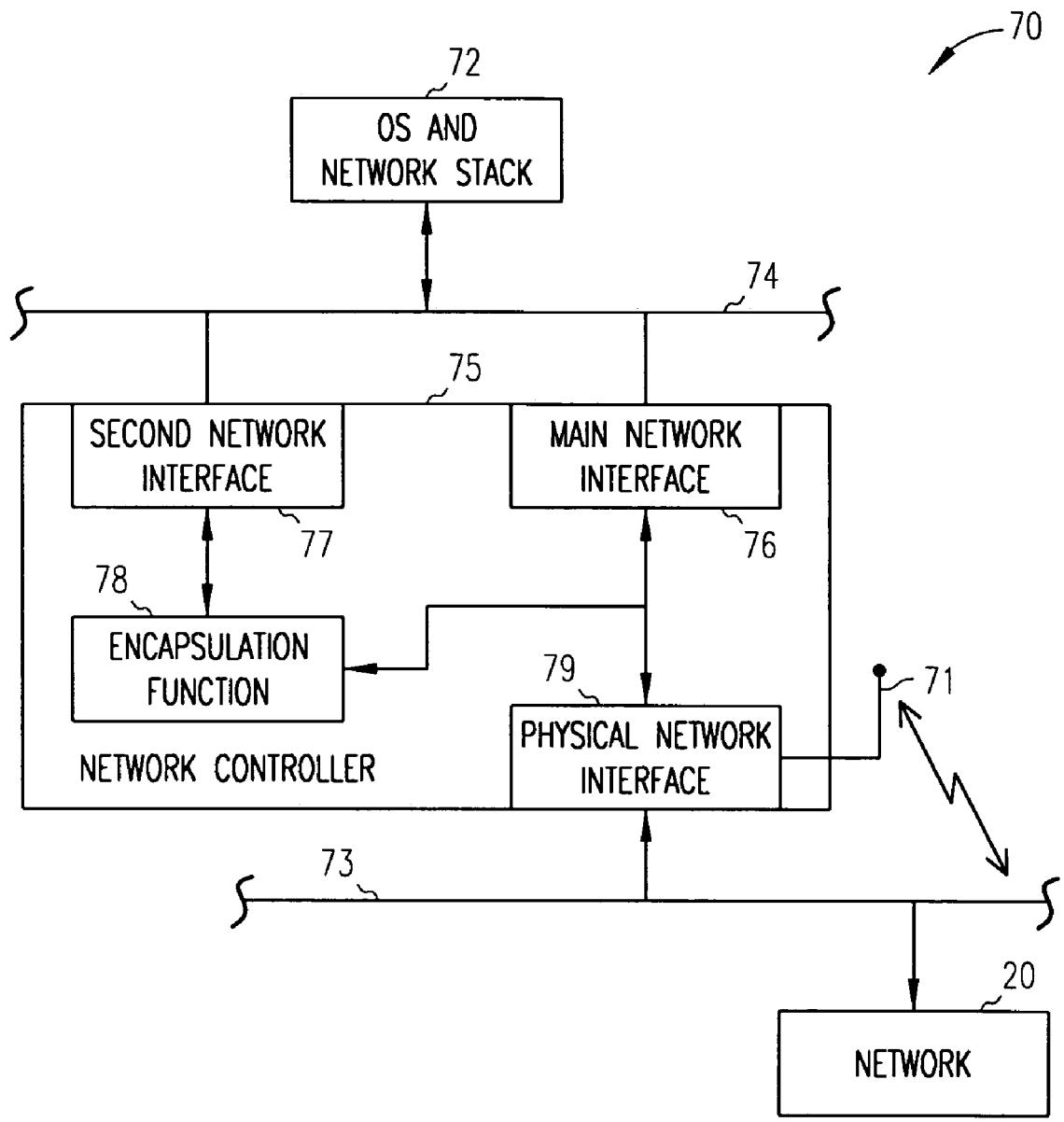
FIG. 3 is a block diagram of an embodiment of the present invention.

FIG. 3 is a functional block diagram of an encapsulation method and system in accordance with some embodiments of the present invention. Encapsulation and redirection system 70 may include an operating system (OS) and network stack 72 which is located in each network host or workstation 50 and 55 and network controller 75, which may be coupled to the OS and network stack 72 via PCI bus structure 74. Network controller 75 may be a wireless network controller and may further be coupled to network 20 via a bus type or an antenna 71 which may comprise a directional or omni-directional antenna, including, for example, a dipole antenna, a monopole antenna, a patch antenna, a loop antenna, a microstrip antenna or other type of antenna suitable for reception and/or transmission of data packet signals. The coupling of network controller 75 to network 20 may be a wireless coupling in an embodiment of the present invention.

Operating system and network stack 72 may include a Windows® XP operating system supplied by Microsoft Corporation or equivalent operating system.

In an embodiment of the present invention, network controller 75 may be network adapter 56 of the workstation 55 of FIG. 1. although the network controller may form a part of almost any network component. In some embodiments, network controller 75 may include a main network interface 76 and the second network interface 77. Both main and second network interfaces 76 and 77 respectively may be coupled to encapsulation function 78. Encapsulation function 78 may be coupled to physical network interface 79 which in turn can be coupled to the network 20 via bus 73.

In some embodiments, main and secondary network interfaces (76, 77) advertise different maximum transmit unit (MTU) to the Network Stack. The MTU defines the maximum size in bytes of network packet that the device is able to transmit on the connection. For Ethernet traffic, for example, this size equals 1514. Now the main interface advertises the actual physical device's MTU, for example 1514 for Ethernet controller, while the secondary network interface 77 exposes a smaller MTU which allows the network controller 75 to append an encapsulation header to outbound packets originated by the OS network stack 72, maintaining the total size of outbound packets smaller then the physical device's MTU. For example when encapsulation is performed using IP tunneling via an Ethernet controller, the secondary network interface 77 would advertise an MTU of 1514−20=1494, where 20 is the size of the IP Header. This would simplify the processing of the network controller 75 when encapsulating outbound packets, as it avoids the need to fragment IP packets or segment higher layer (e.g. TCP/IP) data.

For data packets, which the network security station 30 believes are untampered or the source, workstation 50 or 55, are believed untampered or secure, the OS and network stack 72 of workstation 50 or 55 can transmit such packets to the main network interface 76. Typically, main network interface 76 provides a normal or "non-tunneling" interface from a host or workstation 55 to the network 20. In the case in which network controller 75 determines that the data packet 60 is compromised, network controller 75 effectively switches the processing from main non-tunneling network interface 76 to transmit the data packet through the second tunneling network interface 77. The second network interface 77 tunnels and encapsulates the data packet to redirect it to network security station 30, for example.

In order to accomplish the tunneling and encapsulation, network controller 75 may switch the processing from the main or non-tunneling network interface 76 to select the processing of the second or tunneling network interface 77.

Second network 77 then encapsulates data packet comprising portions 63 and 65 with IP header 62 to direct a "tunneling" of packet 60 through the network to network security station 30. A standard Ethernet header 61 may then be applied to the packet with IP header 62 and 63 and layer 4 header and payload 65. Packet 60 may be transmitted through physical network interface 79 to network 20 for processing according to the Ethernet header 61.

After the network controller 75 has configured for a suspect workstation 55, controller 75 may be reconfigured when network controller 75 receives an indication from security station 30. Second network interface 77 can be removed from the processing flow and main network interface 76 must be selected and enabled in some embodiments. Normal data flow may then take place through main network interface 76 and physical network interface 79 to network 20.

Network controller 75 may be implemented on a semiconductor device fabricated by various technologies known to those of ordinary skill in the art such as silicon, gallium arsenide, etc. The tunneling and non-tunneling network interfaces 76 and 77 respectively may be included on the semiconductor device or "chip" or one or more "chips" in a "chip set" implementation. In addition the encapsulation function 78 and physical network interface 79 may be included on the chip. Further PCI bus 74 and network interface bus 73 may be included on the semiconductor device 75.

Figure 4:
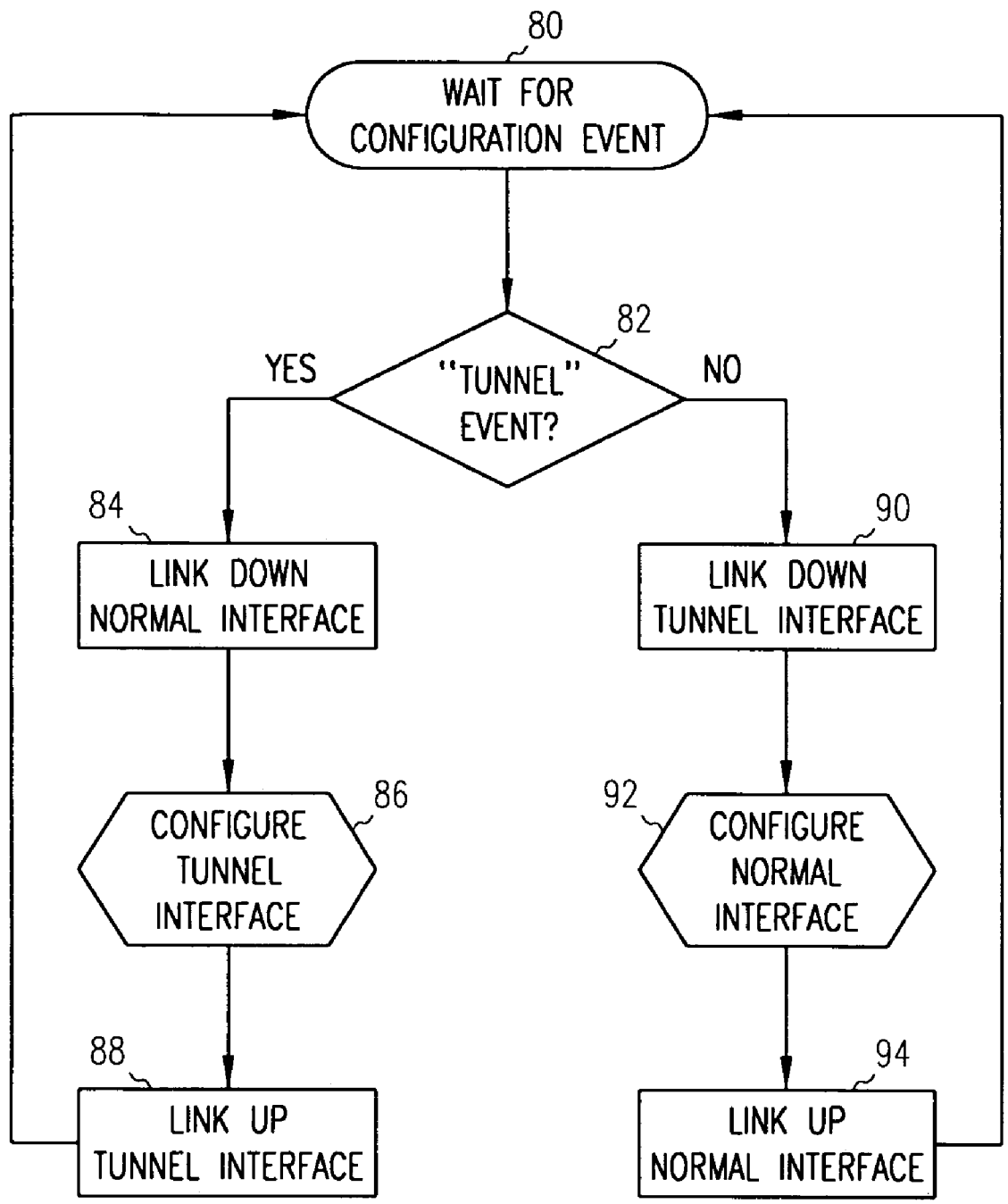
FIG. 4 is a flow chart depicting in an embodiment of the present invention.

FIG. 4 is a flow chart depicting the operation of network controller 75 in some embodiments in accordance with the present invention. Network controller 75 typically waits for a configuration event from network 20, block 80. When a configuration event is detected by network controller 75, block 80 transfers control to block 82. Next, a determination is made whether a "tunnel" event may be requested, block 82.

If a tunneling event is requested, it is indicated that the network node or host workstation 55, for example, transmitting the data packet may have been tampered with. As a result the operation of network controller 75 transfers control via the "yes" path from block 82 to block 84.

Network controller 75 performs a link down of the normal non-tunneling network interface 76, block 84. That is, the main network interface 76 may be disconnected from the processing data transmissions.

Then the second network interface 77 may be configured to provide the requested tunnel "interface," block 86. The second network interface 77 is brought on-line. Data packet 60 is then transmitted to the second network interface 77 for processing by the network controller 75. The tunnel interface provided by the second network interface is effectively linked up to the network, block 88.

If a "tunnel" event is not requested, block 82 transfers control via the "no" path to block 90. This corresponds to a determination that the normal network interface 76 was requested, and a "tunnel" network interface 77, may not required for processing the received data packet.

As a result, the tunnel interface is linked down. That is, the tunnel interface 77 is taken off-line, block 90. Next, the main non-tunneling network interface 76 is configured to be on-line and handle the processing of the incoming data packet, 92. Lastly, the non-tunneling normal interface may be the incoming data packets processing stream, 94. That is, for example, data packet 60 is typically transmitted to main network interface 76 for "normal" processing by network controller 75.

The processing described above for encapsulation and redirection of data packets may take the form of machine-readable software code. This machine-readable software code may be implemented in read only memory (ROM), random access memory (RAM) or electronically programmable read only memory (EPROM) which may be read by a processor or several processors and interpreted to provide the above mentioned method. These memories may be co-located on a semiconductor device or chip along with the network controller 75 or may reside on a stand alone memory device. Further the software may be loaded into a network controller from a memory device such as hard disk, floppy disk or compact disk or a hardware state machine.

As a result of the above-described processing by network controller 75, provides dynamic packet encapsulation and redirection of the data packet of network node host-network traffic without the need for additional software agents or complex hardware. Further, network controller 75 may be implemented on a semiconductor device or a "chip set". This avoids further costs of "add-on" hardware.

Although some embodiments of the invention have been illustrated, and that form described in detail, it will be readily apparent to those skilled in the art that various modifications may be made therein without departing from the spirit of these embodiments or from the scope of the appended claims.

What is claimed is:

1. A method comprising:
   transmitting from a network node via a first interface of the network node, including
      receiving at the first interface a first data packet from a bus of the network node,
      sending the received first data packet from the first interface to a physical network interface of the network node, and
      sending the first data packet from the physical network interface to a network;
   transmitting from the network node via a second interface of the network node, including
      receiving at the second interface a second data packet from the bus of the network node,
      encapsulating the received second data packet to generate an encapsulated second data packet,
      receiving the encapsulated second data packet at the physical network interface of the network node, and
      sending the received encapsulated second data packet from the physical network interface to the network; and
   switching between the transmitting the first data packet from the network node via the first interface and the transmitting the encapsulated second data packet from the network node via the second interface based on a state generated by a network security station, the state including if the network node has been compromised.

2. The method as claimed in claim 1, wherein the encapsulating further includes appending an IP header onto the received second data packet.

3. The method as claimed in claim 1, wherein the switching includes:
   waiting for a configuration event; and
   determining whether the configuration event is a tunneling event.

4. The method as claimed in claim 3, wherein if the determining indicates an occurrence of the tunneling event, the switching further includes taking the first interface offline.

5. The method as claimed in claim 4, wherein if the determining indicates an occurrence of the tunneling event, the switching further including activating the second interface.

6. The method as claimed in claim 5, wherein the taking the first interface offline and the activating the second interface are performed by a network controller.

7. The method as claimed in claim 1, wherein the switching between the transmitting data from the network node via the first interface and the transmitting data from the network node via the second interface is performed for the state indicating tampering on a single workstation basis.

8. The method as claimed in claim 1, wherein the second interface is an interface of a wireless network controller of the network node.

9. A network controller comprising:
a physical network interface to couple a network node to a network;
a first interface coupled to the physical network interface, the first interface having a first maximum transmit unit (MTU) size, the first interface to receive a first data packet from a bus of the network node, the first interface further to send the received first data packet to the physical network interface, wherein the physical network interface further to send the first data packet to the network;
a second interface having a second MTU size smaller than the first MTU size, the second interface to receive a second data packet from the bus of the network node;
an encapsulator coupled to the second interface and to the physical network interface, the encapsulator to receive the second data packet from the second interface, the encapsulator further to append an IP header to the data packet to produce an encapsulated second data packet, the encapsulator further to provide the encapsulated second data packet to the physical network interface, wherein the physical network interface further to send the encapsulated second data packet to the network; and
a controller to operate the network controller as a network adapter of the network node, including switching between the first interface receiving the first data packet from the bus of the network node and the second interface receiving the second data packet from the bus of the network node, the switching based on a state generated by a network security station, the state indicating if the network node has been compromised.

10. The network controller as claimed in claim 9, wherein the network node includes an operating system.

11. The network controller as claimed in claim 9, wherein each of a plurality of network nodes includes the controller.

12. A machine-readable medium that provides instructions, which when executed by one or more processors, cause the processors to perform operations comprising:
transmitting from a network node to a network via a first interface of the network node, including
receiving at the first interface a first data packet from a bus of the network node,
sending the received first data packet from the first interface to a physical network interface of the network node, and
sending the first data packet from the physical network interface to a network;
transmitting from the network node to the network via a second interface of the network node, including
receiving at the second interface a second data packet from the bus of the network node,
encapsulating the received second data packet to generate an encapsulated second data packet,
receiving the encapsulated second data packet at the physical network interface of the network node, and
sending the received encapsulated second data packet from the physical network interface to the network; and
selecting between transmitting the first data packet from the network node via the first interface and transmitting the encapsulated second data packet from the network node via the second interface based on a state generated by a network security station, the state including if the network node has been compromised.

13. The machine-readable medium as claimed in claim 12, wherein encapsulating the received second data packet includes appending to the received second data packet a header including an IP header.

14. The machine-readable medium as claimed in claim 12, wherein the selecting includes:
waiting for a configuration event; and
determining whether the configuration event is a tunneling event.

15. The machine-readable medium as claimed in claim 14, wherein if the determining indicates an occurrence of the tunneling event, the selecting further includes taking the first interface of the network node offline.

16. The machine-readable medium as claimed in claim 12, wherein the selecting includes selecting the transmitting data from the network node via the second interface where the state of the network node indicates tampering.

17. A network node comprising:
a bus;
a network stack coupled to the bus;
a network adapter coupled to the network stack via the bus, the network adapter including,
a physical network interface,
a first interface coupled to the physical network interface, the first interface having a first maximum transmit unit (MTU) size, the first interface to receive a first data packet from the bus, the first interface further to send the received first data packet to the physical network interface, wherein the physical network interface further to send the first data packet to a network,
a second interface having a second MTU size smaller than the first MTU size, the second interface to receive a second data packet from the bus,
an encapsulator coupled to the second interface and to the physical network interface, the encapsulator to receive the second data packet from the second interface, the encapsulator further to append an IP header to the second data packet to produce an encapsulated second data packet, the encapsulator further to provide the encapsulated second data packet to the physical network interface, wherein the physical network interface further to send the encapsulated second data packet to the network, and
a controller to select between the first interface receiving the first data packet from the bus and the second interface receiving the second data packet from the bus, the selecting based on a state generated by a network security station, the state indicating if the network node has been compromised; and
an omni-directional antenna for coupling the physical network interface to the network.

18. The network node as claimed in claim 17, the network adapter including a wireless network controller.

19. The network node as claimed in claim 17, wherein there is further included a router to transmit the data packet from the controller to the network.

20. The network node as claimed in claim 17, wherein the bus includes a peripheral control interface (PCI) bus.

21. The network node as claimed in claim 17, wherein the network includes at least one of:
an intranet;
an internet;
a local area network (LAN); and
a wireless local area network (WLAN).

* * * * *